Oct. 2, 1945.  G. MOORHEAD  2,385,876
COLOSTOMY APPARATUS
Filed Jan. 13, 1944
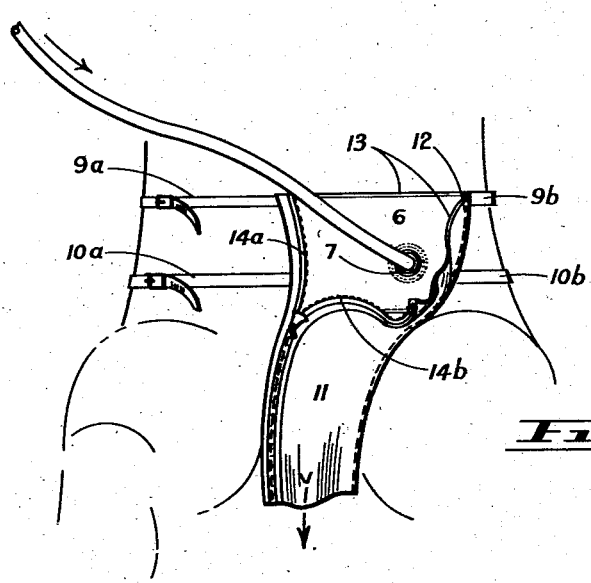
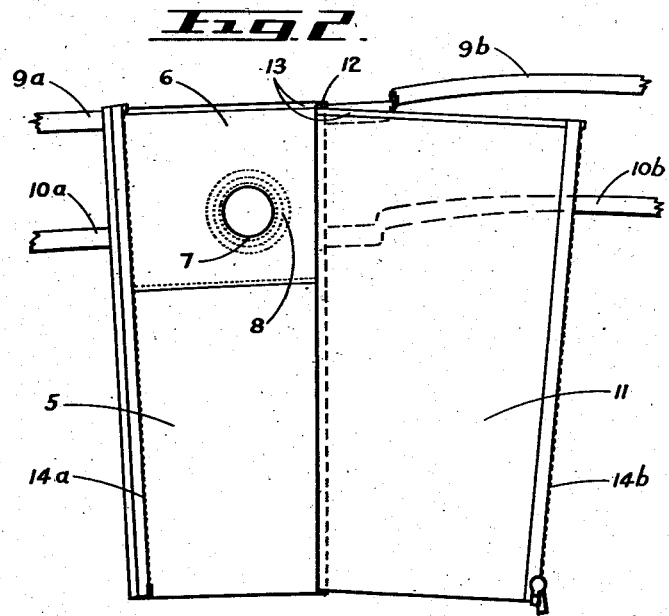
Inventor
GLADYS MOORHEAD
By W. Irwin Haskett
her Attorney.

Patented Oct. 2, 1945

2,385,876

UNITED STATES PATENT OFFICE 2,385,876

COLOSTOMY APPARATUS

Gladys Moorhead, Ottawa, Ontario, Canada

Application January 13, 1944, Serial No. 518,183
In Canada November 6, 1943

6 Claims. (Cl. 128—283)

This present invention relates to improvements in a colostomy apparatus and appertains particularly to an irrigation apron designed to simplify and minimize the inconvenience of the enema or irrigation that must be done daily following a colostomy operation.

An object of the invention is to provide a colostomy irrigation device that is entirely safe, affording secure covering to the person when conveying the return flow to the toilet, and thoroughly sanitary.

A further object of the invention is to provide an irrigation shield wherein the return flow is open to observation thus enabling the success of the procedure to be determined with certainty.

A further object of the invention is to provide an irrigation apron that may be simply and quickly applied and will be comfortable to use.

A further object of the invention is to provide a colostomy irrigation apron that is light weight, small in size and compact to carry or store away when not in use.

A still further object of the invention is the provision of a device of the nature and for the purpose described that is characterized by structural simplicity, durability and efficiency and being capable of production and sale at a reasonable cost is thereby rendered commercially desirable.

To the accomplishment of these and related objects as shall become apparent as the description proceeds, the invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure wherein like characters indicate like parts throughout the several views.

In the drawing:

Figure 1 is an illustration of my apparatus as applied to the body of a patient; and Figure 2 is an elevation of the apron, in open position.

After a colostomy operation that establishes a new route from the bowels through an opening in the abdominal wall, serving as an artificial anus, great inconvenience, discomfort, embarrassment and derangement of the normal life of the individual may result unless certain well-defined routine is faithfully followed every day. Under approved current medical practice the bowels are evacuated once-a-day through the permanent orifice or cicatrix by the use of an enema of soap suds. If the procedure be complete, the opening can then be covered with a light dressing for approximately 24 hours. Should the irrigation not prove entirely satisfactory, resort should be had to a second enema otherwise further uncontrolled evacuations may occur through the day. For this reason it is well that the results of the procedure should be subject to observation.

With my improved apparatus, the colostomy patient's irrigation difficulties are reduced to the minimum, the return flow while observable is conveyed without possibility of accident and the shield is so light and easy to use and simple to clean.

My colostomy apparatus is essentially a flow tube, possibly made of a single piece, having a lateral opening on its inner side near the upper end and provided with attaching means to engage the body of the user. For ease in manufacture, it seems desirable for the present that the instant shield consist of a 2-ply apron of impermeable material attached to the body of the wearer over the location of the abdominal opening by suitable body-encircling bands. The inner ply of the apron has a perforation designed to register with and receive the cicatrix while the outer ply or layer, joined to it along opposite vertical edges though preferably disconnectable at least along part of one side from the inner ply, has none and together these inner and outer layers provide a receptacle or passage into which the return flow of the irrigation empties.

The hereindescribed and preferred embodiment of the invention shows the irrigation apron as consisting of an elongated slightly tapered, inner or body-engaging shield 5 of suitable impervious material, such as sheet rubber, rubberized fabric, oiled silk or the like, with the upper ⅔ reinforced with a second thickness 6. Through this double strength top part a window or opening 7 is provided which is to receive the abdominal opening and since these may vary in size, I surround such window 7 with a number of concentric rows of stitching 8, connecting the two layers, so that it may be enlarged to any required size by simply cutting with scissors between adjacent rows.

The two parts 9a and 9b of an adjustable body-engaging band extend from opposite sides of this shield 5 near its top. They encircle the wearer at the waist-line. The two parts 10a and 10b of a second band extend from opposite sides of the shield in line with or just below the window 7 to encircle the wearer at about the level of the abdominal opening so as to hold the shield in this vicinity closely against his body. Both these attaching straps it will be noted are joined to the reinforced or double upper part of the inner shield.

The outer shield 11, which may be formed integral with the former but is here shown as stitched thereto along one vertical edge 12, follows the said inner and superimposed shield in general form though it has no opening, is of a single thickness throughout but is preferably of substantially greater width. A reinforcing finishing tape 13 runs across the top edge of both inner and outer shields 5 and 11 respectively and, on their free or outer edges, both layers or shields are provided with the complementary parts 14a and 14b respectively of a separable fastener. While the two shields could be permanently stitched part way up from the bottom, and any desired type of separable fastener could be used to connect the upper portion of their free edges, I prefer to use an open zipper-type fastener since it affords a continuous closure for the entire height as well as allowing the apron to be opened out for thorough cleansing. Because the outer shield is wider it normally assumes a position spaced outwardly from the underlying one and a drain tube or passageway is thereby formed.

In use, after the apron has been applied with the opening 7 cut to the proper size and arranged to surround the abdominal opening, the zipper is opened part way down the free side and a catheter, on the end of a tube from an enema can, is introduced into the colostomy opening. When the catheter is withdrawn and the apron zipped to the top, the return flow pours into the apron and is conducted to the toilet bowl. The evacuation continues for some time, but if the procedure has been complete, the apron may be removed and the opening covered with only a simple dressing.

From the foregoing description taken in connection with the accompanying drawing, it will be manifest that a colostomy apparatus is provided that will fulfill all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawing shall be interpreted as illustrative and not in a limitative or restrictive sense.

Having thus described my invention, what I claim as new is:

1. A colostomy irrigation apron comprising a laterally disposed pair of panels of impervious material connected along their opposite vertical edges and free across the bottom with the outer panel substantially wider than the inner panel to provide a free passageway or drain tube, a second layer of material covering the upper two-fifths of the inner panel to reinforce the same, the double-thickness upper part of the inner panel having an opening therein, and body attaching means comprising a pair of vertically spaced body encircling bands connected to opposite sides of the double-thickness upper part of said inner panel.

2. A colostomy irrigation apron comprising a body-engaging inner shield, the upper part of which is reinforced with a second layer of material, an opening through said double layer upper part, concentric rows of stitching joining both layers around said opening, an outer shield connecting with said inner shield along opposite vertical sides and a pair of vertically spaced body encircling bands connecting with opposite sides of said inner shield at the top and approximately in line with said opening, respectively.

3. A colostomy irrigation apron of impermeable fabric-like material comprising a body-engaging tapered inner shield, the wider upper part of which is reinforced with a second layer of material, an opening through said double-layer upper part, concentric rows of stitching joining both layers around said opening, a substantially wider and similarly tapered superposing outer shield attached to said inner shield along one vertical side, a pair of vertically spaced body encircling bands connecting with opposite sides of the reinforced upper portion of said inner shield at the top and approximately in line with said opening, respectively, and the complementary stringers of an open, zipper-type fastener on the free vertical edges of said inner and outer shields.

4. A colostomy irrigation shield comprising an inner panel and an outer panel, said outer panel being imperforate and fixedly attached to the inner panel along one side edge, the other side edge being connected to the corresponding opposite side edge of the inner panel by means of a readily detachable substantially leak-proof connection in its closed condition with both ends of the shield open, and the inner panel having an opening designed to register with and receive the cicatrix of the patient so that when the detachable connection is at least partially released to expose the opening a catheter may be readily inserted directly into the cicatrix.

5. A colostomy irrigation shield as recited in and by claim 4 and including, a reinforcement for the upper part of the inner panel in the form of a second layer of material, the said opening being in the reinforced upper part of the inner panel, and means for attaching said shield to a person's body.

6. A colostomy irrigation shield as recited in and by claim 4 and including, a reinforcement for the upper part of the inner panel in the form of a second layer of material extending from side to side of said panel and extending downwardly for about two-fifths of the length of the panel, the said opening being in the reinforced upper part of the inner panel, and means for attaching said shield to a person's body.

GLADYS MOORHEAD.